United States Patent
Kim

[19]

[11] Patent Number: 5,907,225
[45] Date of Patent: May 25, 1999

[54] METHOD AND APPARATUS FOR DRIVING A POLYPHASE SENSORLESS MOTOR

[75] Inventor: Hyung-Cheol Kim, Kyeongki-Do, Rep. of Korea

[73] Assignee: Daewoo Electronics Co., Ltd., Seoul, Rep. of Korea

[21] Appl. No.: 09/104,235

[22] Filed: Jun. 25, 1998

[30] Foreign Application Priority Data

Jun. 25, 1997 [KR] Rep. of Korea ........................ 97-27005
Jun. 25, 1997 [KR] Rep. of Korea ........................ 97-27006

[51] Int. Cl.$^6$ ................................... H02P 6/22
[52] U.S. Cl. .................. 318/254; 318/721; 318/439; 318/138; 318/727
[58] Field of Search ................... 318/721, 439, 318/138, 727, 254

[56] References Cited

U.S. PATENT DOCUMENTS

| | | | |
|---|---|---|---|
| 4,992,710 | 2/1991 | Cassat | 318/254 |
| 5,028,852 | 7/1991 | Dunfield | 318/254 |
| 5,038,092 | 8/1991 | Asano et al. | 318/811 |
| 5,235,264 | 8/1993 | Kaneda et al. | |
| 5,254,918 | 10/1993 | Ueki | 318/466 |
| 5,350,987 | 9/1994 | Ueki | 318/466 |
| 5,608,300 | 3/1997 | Kawabata et al. | 318/721 |
| 5,612,605 | 3/1997 | Tao | 318/805 |

FOREIGN PATENT DOCUMENTS

| | | |
|---|---|---|
| 0 490 395 | 6/1992 | European Pat. Off. . |
| 0 573 198 | 12/1993 | European Pat. Off. . |
| 97/11524 | 3/1997 | WIPO . |

*Primary Examiner*—William M. Shoop, Jr.
*Assistant Examiner*—Rita Leykin
*Attorney, Agent, or Firm*—Pillsbury Madison & Sutro LLP

[57] ABSTRACT

A method and an apparatus for driving a polyphase sensorless motor are disclosed. A method for driving a polyphase sensorless motor having a rotor and a plurality of pairs of phase coils detects first and second magnetic flux saturation time values from each of the plurality of pairs of phase coils by respectively and sequentially applying the first and second test current signals to the plurality of the pairs of phase coils, stores the detected first and second magnetic flux saturation time values, sets an average value of a plurality of magnetic flux saturation time difference values calculated from the first and second magnetic flux saturation time values corresponding to each of the plurality of the pairs of phase coils to an optimum test current application period, determines a driving-current application initial position of the polyphase sensorless motor based on the optimum test current application period, selects maximum magnetic flux saturation time values corresponding to each of the plurality of the pairs of phase coils from the first and second magnetic flux saturation time values of each of the plurality of the pairs of phase coils, sets a final maximum magnetic flux saturation time value detected from the selected plurality of maximum magnetic flux saturation time values to an optimum driving-current application period, and drives the polyphase sensorless motor based on the driving-current application initial position and the optimum driving-current application period. Accordingly, a video cassette recorder can accurately determine a driving position in either a stop status or a low-speed driving status of the head drum motor and can improve a driving character thereof.

9 Claims, 9 Drawing Sheets

METHOD AND APPARATUS FOR DRIVING A POLYPHASE SENSORLESS MOTOR

BACKGROUND OF THE INVENTION

1. Field of the Invention

The present invention relates to a motor, and more particularly, to a method and an apparatus for driving a polyphase sensorless motor using a driving-current application initial position and a driving-current application period which is detected based on an inductance variation of a plurality of phase coils.

2. Description of the Prior Art

In general, a video cassette recorder includes a capstan motor and a head drum motor. A prior video cassette recorder determines a position of a rotor for driving the motors by using sensors, such as a hole sensor or an optical sensor, and controls a commutation of a phase current which is applied to the motors according to the determined position information.

However, in the sensor-type, a space for installing the sensors is required and the cost of a product is increased by using expensive sensors.

Accordingly, a sensorless-type which does not use the sensors is currently widely adopted.

For example, U.S. Pat. No. 5,235,264 (granted to Isao Kaneda et al.) titled "METHOD OF AND CIRCUIT FOR STARTING SENSORLESS MOTOR" discloses a method and a circuit for detecting a back electromotive force which is inducted to a phase coil in order to determine the position of the magnetic rotor of the sensorless motor and for determining the commutation of the magnetic rotor based on the detected back electromotive force.

A strength of the back electromotive force which is inducted to a coil is proportioned to a rotation speed of the rotor. Therefore, in a back electromotive force-type, when a driving status of the rotor is either a stop status or a low speed status, the back electromotive force does not exist or is very small. As a result, in the back electromotive force-type, a control of the commutation is not accurate before the rotor is rotated more than a predetermined speed which the back electromotive force being detected sufficiently.

SUMMARY OF THE INVENTION

Therefore, in order to solve the problems of the prior art as described above, it is an object of the present invention to provide a method for driving a polyphase sensorless motor using a driving-current application initial position and a driving-current application period which is detected based on an inductance variation of a plurality of phase coils.

It is an another object of the present invention to provide an apparatus for driving a polyphase sensorless motor using a driving-current application initial position and a driving-current application period which is detected based on an inductance variation of a plurality of phase coils.

In order to achieve the above object, the present invention provides a method for driving a polyphase sensorless motor having a rotor and a plurality of pairs of phase coils, which comprises the steps of:

(i) detecting first and second magnetic flux saturation time values which respectively correspond to first and second test current signals from each of the pairs of the phase coils by respectively and sequentially applying the first and second test current signals to the pairs of the phase coils and storing the detected first and second magnetic flux saturation time values;

(ii) setting an average value of a plurality of magnetic flux saturation time difference values calculated from the first and second magnetic flux saturation time values corresponding to each of the pairs of the phase coil to an optimum test current application period;

(iii) determining a driving-current application initial position of the polyphase sensorless motor based on the optimum test current application period which is set in step (ii);

(iv) selecting maximum magnetic flux saturation time values corresponding to each of the pairs of the phase coils from the first and second magnetic flux saturation time values detected from each of the pairs of the phase coils and setting a final maximum magnetic flux saturation time value detected from the selected plurality of maximum magnetic flux saturation time values to an optimum driving-current application period; and (v) driving the polyphase sensorless motor based on the driving-current application initial position determined in step (iii) and the optimum driving-current application period set in step (iv).

In order to achieve the above object, the present invention provides an apparatus for driving a polyphase motor having a rotor and a plurality of pairs of phase coils, which comprises:

switch driving means, responsive to switching control signals inputted from outside, for supplying first and second test current signals to the plurality of the pairs of the phase coils, respectively, for detecting a current value from the plurality of the pairs of the phase coils, and for outputting the detected current value;

analog-digital converting means for converting the current value inputted from the switch driving means into a digital signal; and control means for providing the switching control signals to the switch driving means in order to supply the first and second test current signals to the plurality of the pairs of the phase coils, for detecting first and second magnetic flux saturation time values of each of the plurality of the pairs of the phase coils which respectively correspond to the first and second test current signals based on the current value inputted from the analog-digital converting means, for setting an average value of a plurality of magnetic flux saturation time difference values calculated from the first and second magnetic flux saturation time values to an optimum test current application period, for determining a driving-current application initial position of the polyphase sensorless motor based on the set optimum test current application period, for selecting maximum magnetic flux saturation time values corresponding to each of the plurality of the pairs of the phase coils from the detected first and second magnetic flux saturation time values, respectively, and for setting a final maximum magnetic flux saturation time value which is detected from the selected plurality of the maximum magnetic flux saturation time values to an optimum driving-current application period of the polyphase sensorless motor.

In the method and apparatus for driving a polyphase sensorless motor according to the present invention, a driving-current application initial position and a driving-current application period of a head drum motor are detected based on a current value according to an inductance of the motor coil which is varied by means of a test current. As a result, a video cassette recorder can accurately determine a driving position in either a stop status or a low-speed driving status of the head drum motor and can improve a driving character thereof.

BRIEF DESCRIPTION OF THE DRAWINGS

The above objects and other advantage of the present invention will become more apparent by describing in detail a preferred embodiment thereof with reference to the attached drawings, in which.

DESCRIPTION OF THE PREFERRED EMBODIMENT

A description will be given below in detail with reference to accompanying drawings to a configuration and an operation of a method and an apparatus for driving a polyphase sensorless motor according to embodiments of the present invention.

Figure 1:
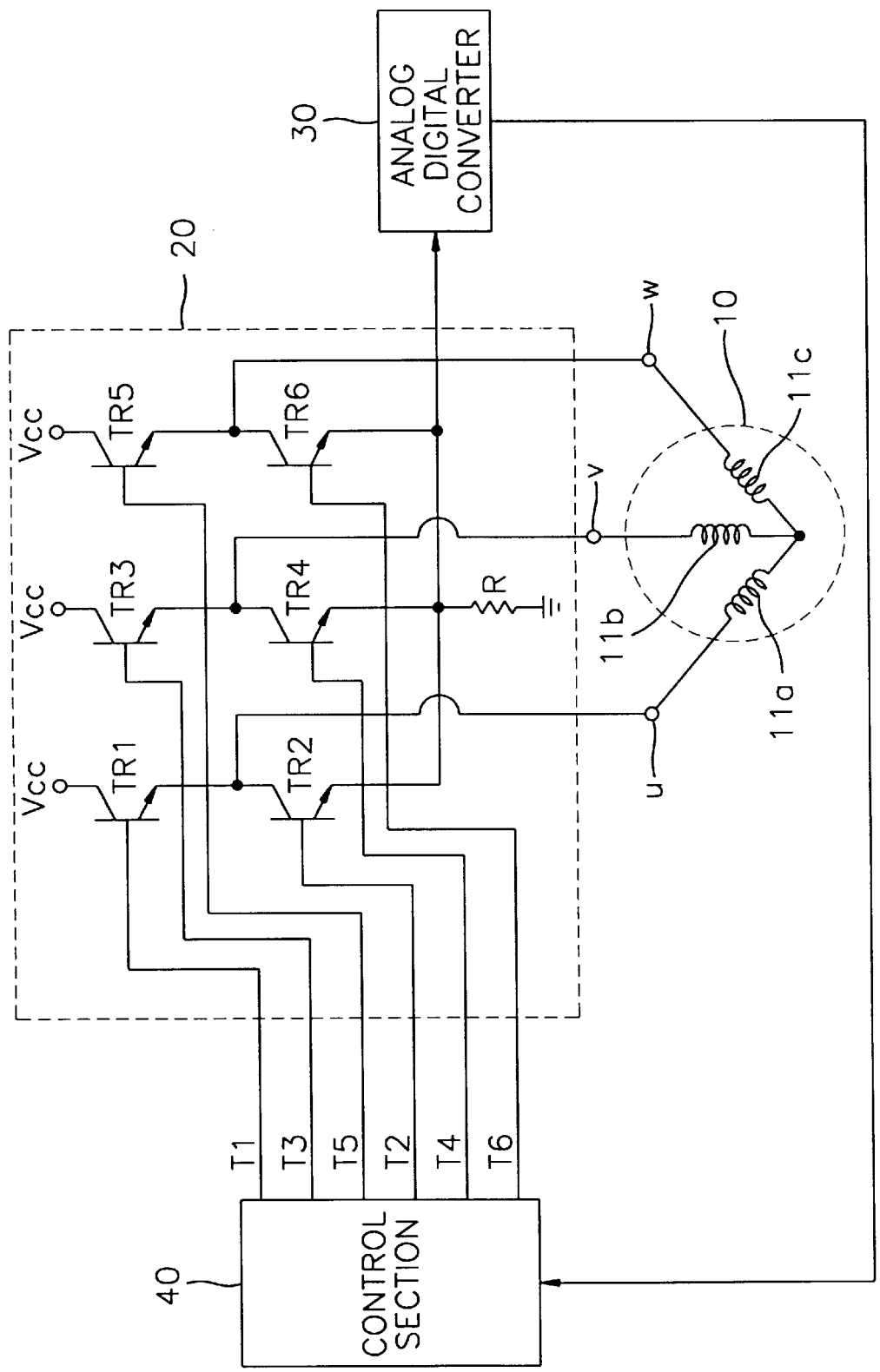
FIG. 1 is a block diagram for showing a circuit configuration of an apparatus for driving a polyphase sensorless motor according to one embodiment of the present invention.

FIG. 1 is a block diagram for showing a circuit configuration of an apparatus for driving a polyphase sensorless motor according to an embodiment of the present invention. As shown in FIG. 1, the apparatus for driving the polyphase sensorless motor has a sensorless motor 10, a switch driving section 20, an analog-digital converting section 30, and a control section 40.

Sensorless motor 10 has a motor coil of three phases 11a, 11b and 11c (hereinafter, referred to as a U phase, a V phase, and a W phase). Also, sensorless motor 10 includes a rotor (not shown) having a plurality of magnetic poles.

Switch driving section 20 executes either an ON or an OFF operation in response to switching control signals T1, T2, T3, T4, T5 and T6 from control section 40 and has first, second, third, fourth, fifth, and sixth transistors TR1, TR2, TR3, TR4, TR5 and TR6 for applying either a test current signal or a driving voltage to the respective phase coils 11a, 11b and 11c and a resistor R. Respective base terminals of first, second, third, fourth, fifth, and sixth transistors TR1, TR2, TR3, TR4, TR5 and TR6 are connected to control section 40 and receive switching control signals T1, T2, T3, T4, T5 and T6 from control section 40. Respective collector terminals of first, third, and fifth transistors TR1, TR3 and TR5 receive bias voltage Vcc. Respective emitter terminals of first, third, and fifth transistors TR1, TR3 and TR5 connect with phase coils 11a, 11b and 11c, respectively. Respective collector terminals of second, fourth, and sixth transistors TR2, TR4 and TR6 are connected to the emitter terminals of first, third, and fifth transistors TR1, TR3 and TR5, respectively. Respective emitter terminals of second, fourth, and sixth transistors TR2, TR4 and TR6 are serially connected to resistor R and are connected to a ground terminal.

Analog-digital converting section 30 converts a current value of an analog signal which is respectively inputted from the emitter terminals of second, fourth, and sixth transistors TR2, TR4 and TR6 into a digital signal.

Control section 40 provides first, second, third, fourth, fifth, and sixth switching control signal T1, T2, T3, T4, T5 and T6 to switch driving section 20 for supplying a first test current signal and a second test current signal to respective phase coils 11a, 11b and 11c.

Control section 40 detects first and second magnetic flux saturation time values corresponding to the respective first and second test current signals of each pairs of the phase coils U→V, V→U, V→W, W→V, W→U and U→W based on the current value inputted from analog-digital converting section 30.

Control section 40 sets an average value of a plurality of magnetic flux saturation time difference values calculated from the first and second magnetic flux saturation time values of respective pairs of the phase coils U→V, V→U, V→W, W→V, W→U and U→W to an optimum test current application period. Control section 40 determines a driving-current application initial position of the plurality of phase coils of sensorless motor 10 based on the set optimum test current application period.

In addition, control section 40 selects maximum magnetic flux saturation time values corresponding to respective pairs of the phase coils U⇌V, V⇌W and W⇌U from the detected magnetic flux saturation time values and sets a final maximum magnetic flux saturation time value detected from the selected plurality of the maximum magnetic flux saturation time values to an optimum driving-current application period of sensorless motor 10.

Figure 2:
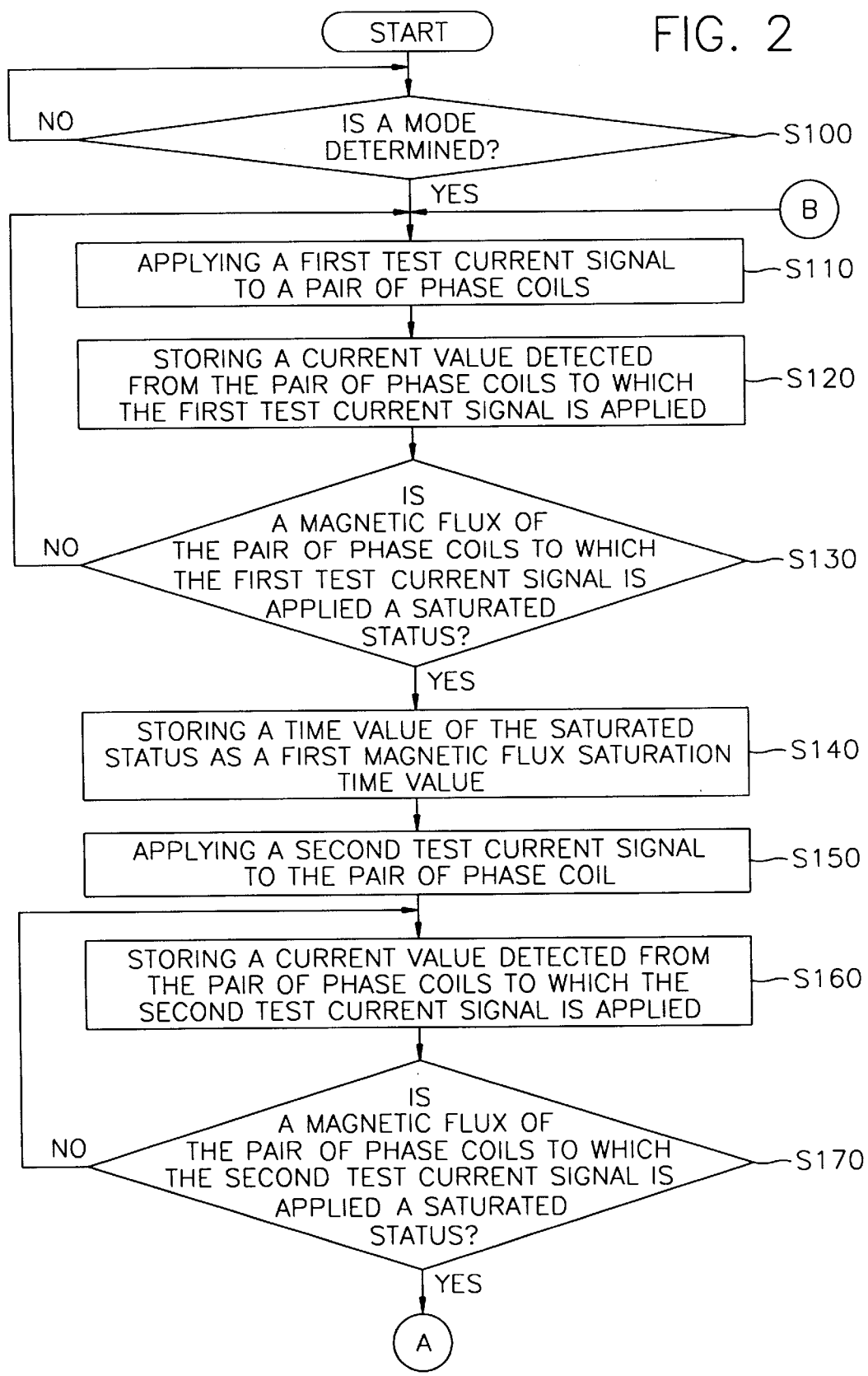
FIGS. 2 to 4 are a flowchart for illustrating a method for driving a polyphase sensorless motor according to one embodiment of the present invention.
Figure 3:
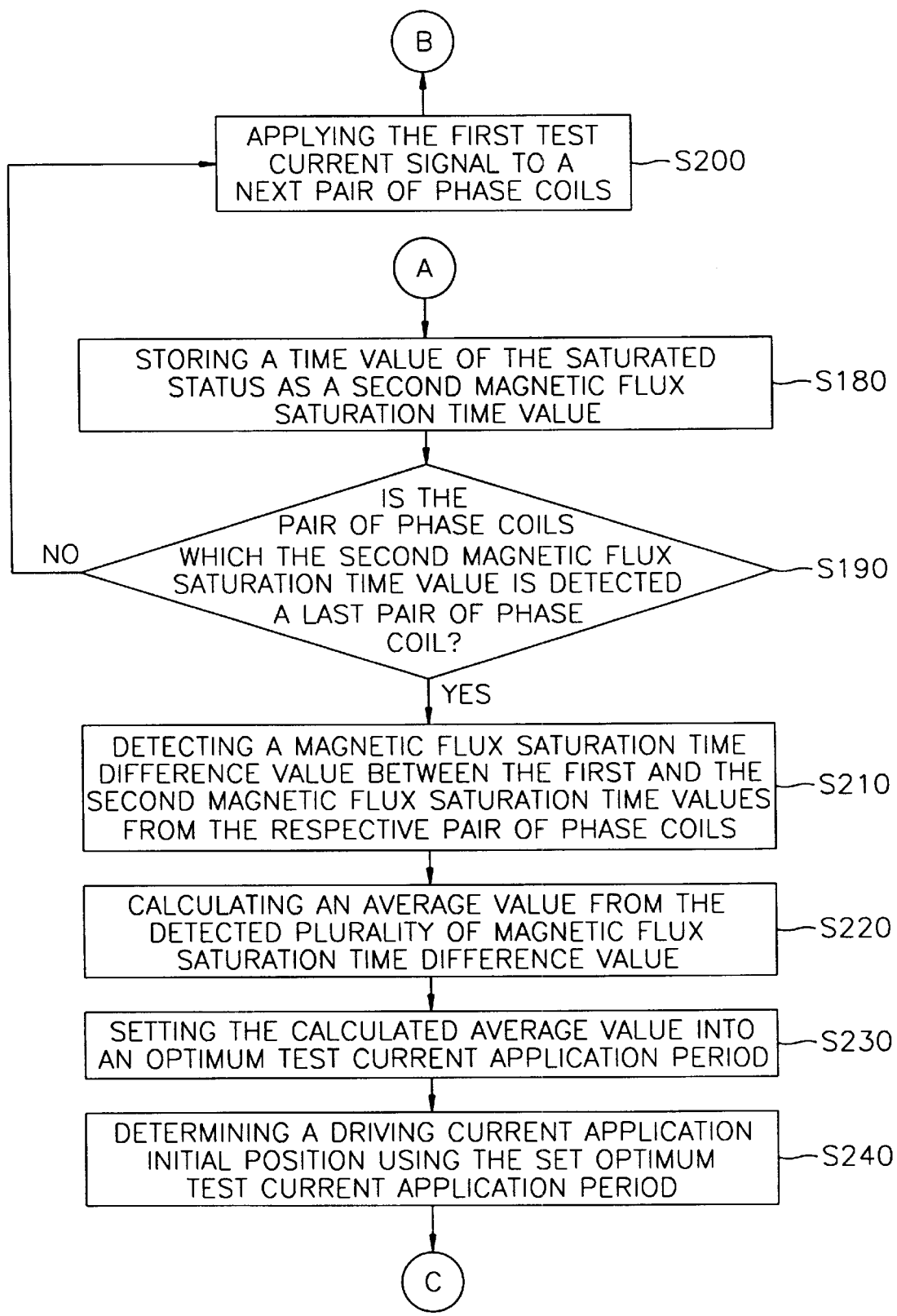
Figure 4:
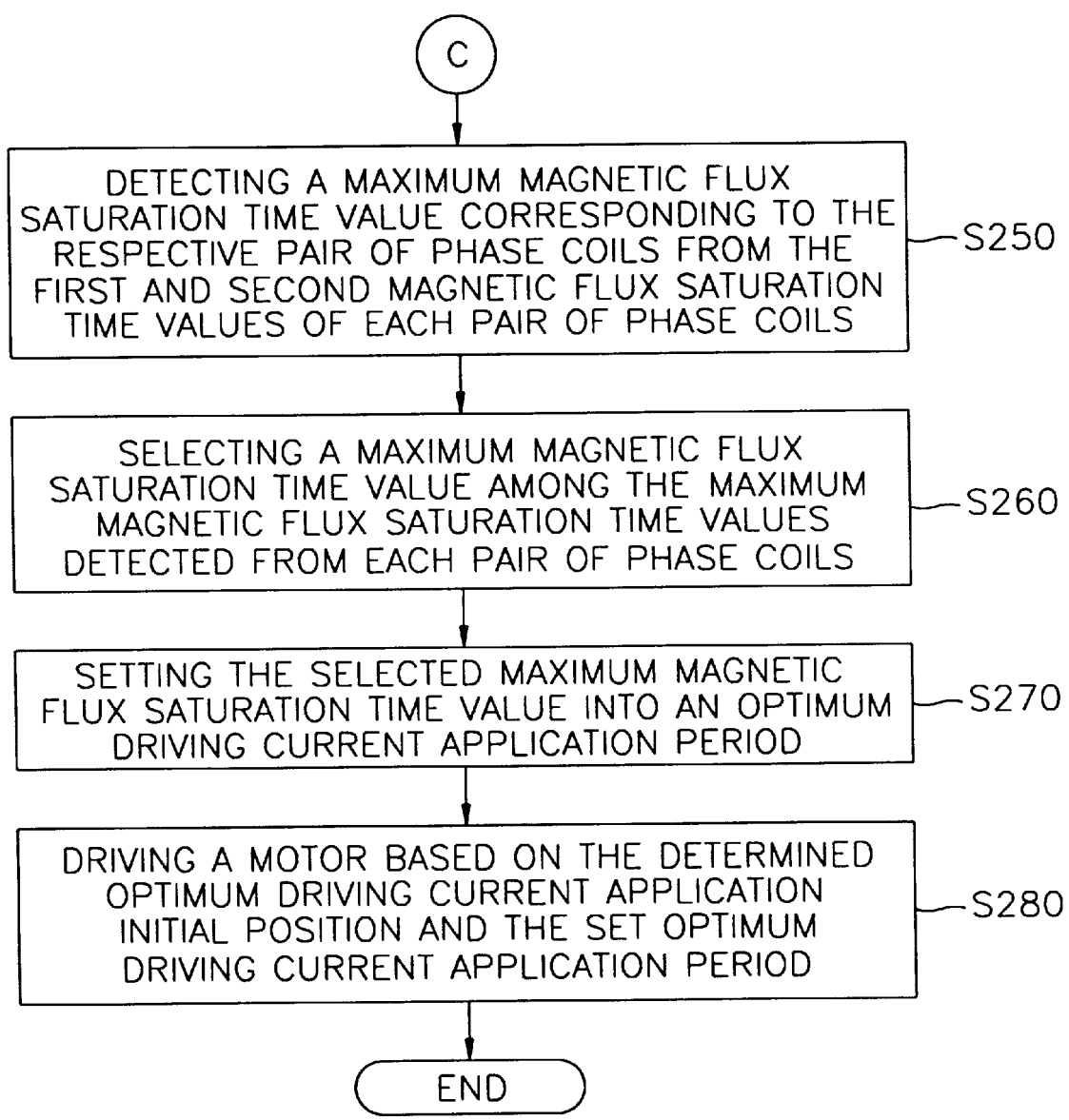

Hereinafter, the procedure of the method for driving a polyphase sensorless motor which is performed by the apparatus shown in FIG. 1, will be described with reference to the flowchart as shown in FIGS. 2 to 4.

FIGS. 5 to 9 are illustrated with FIGS. 2 to 4 in order to illustrate in detail the method for driving the polyphase sensorless motor according to the present invention.

Figure 5:
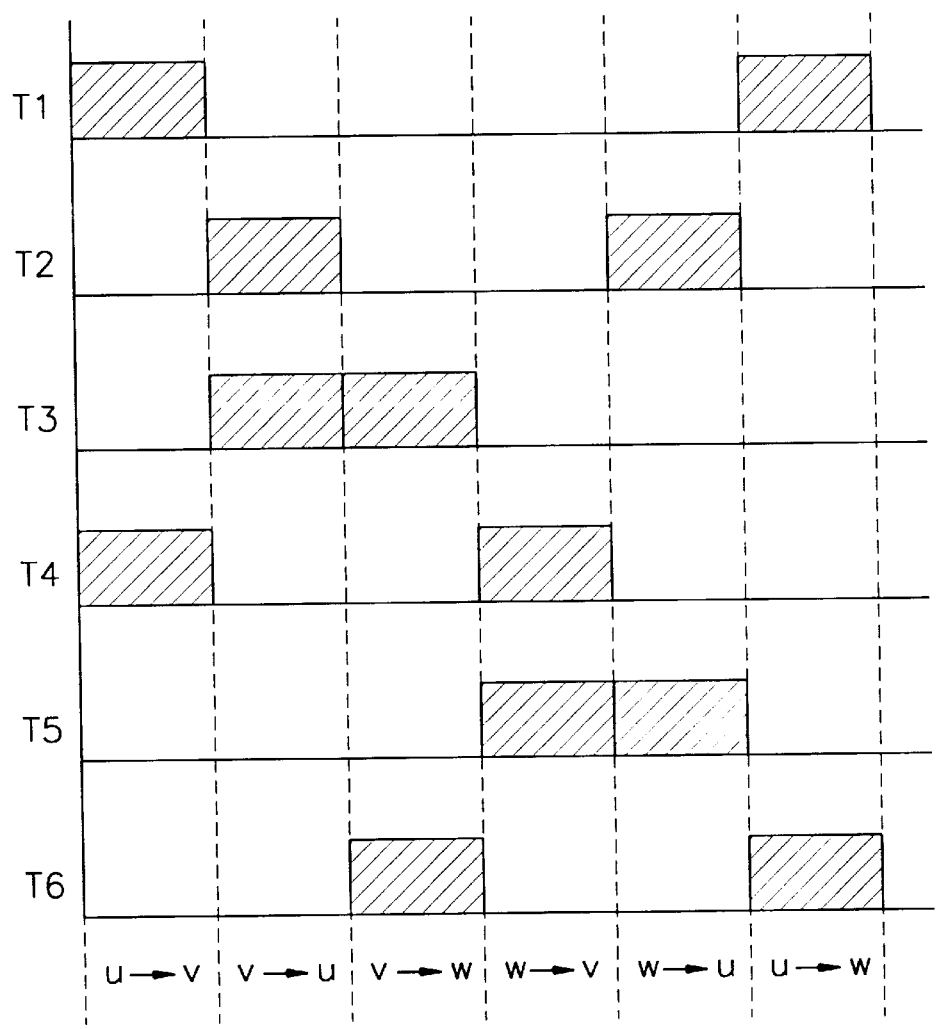
FIG. 5 is a pulse waveform diagram for showing a switching control signal which is outputted from a control section of the apparatus shown in FIG. 1.
Figure 6:
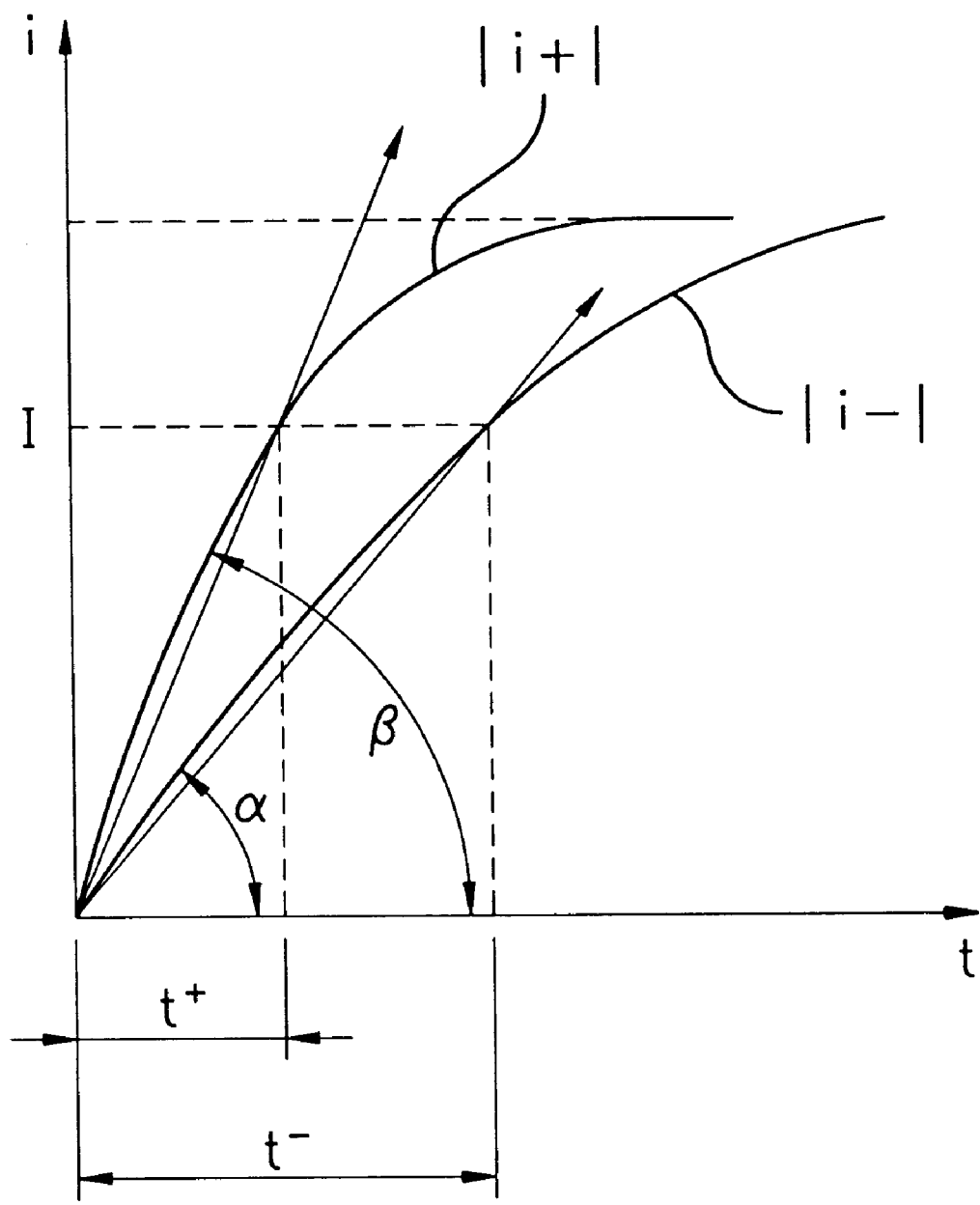
FIG. 6 is a graph for showing current variation detected according to inductance variation of the apparatus shown in FIG. 1.
Figure 7:
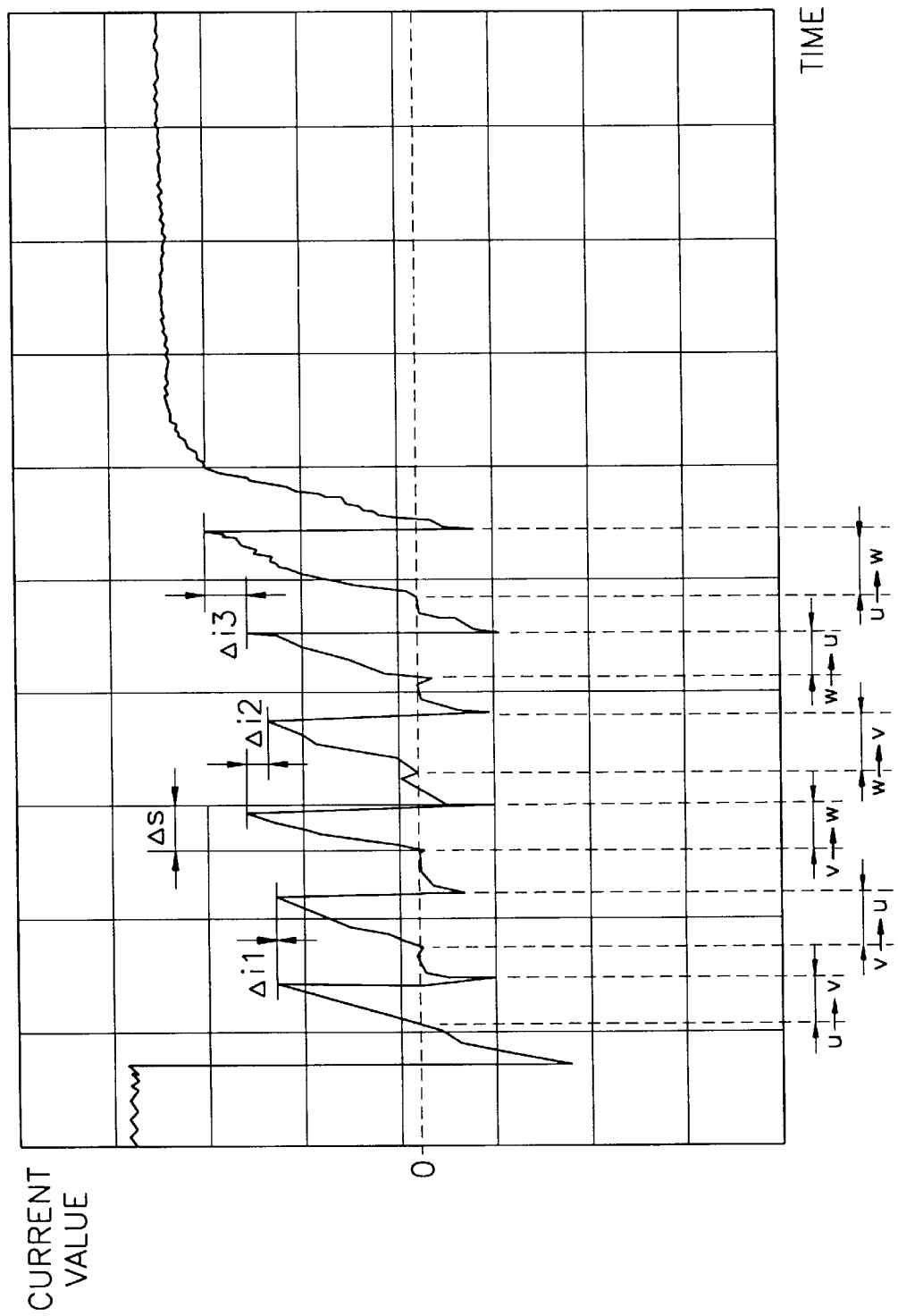
FIG. 7 is a graph for showing an optimum test current application period of the apparatus shown in FIG. 1.
Figure 8A:
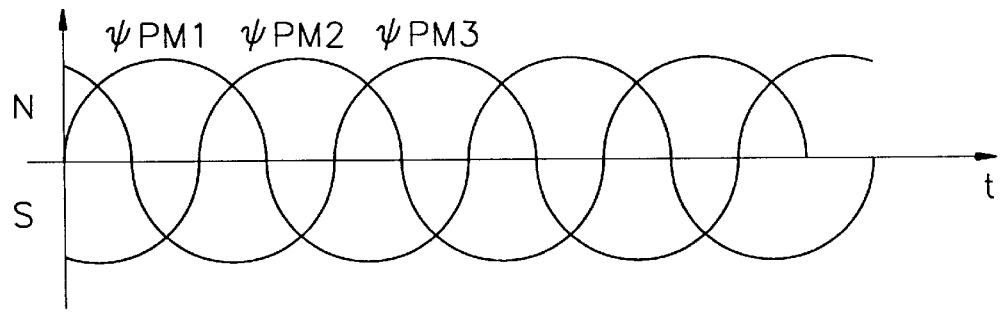
FIG. 8A is a waveform diagram for illustrating phase variation according to a magnetic flux of a head drum motor of the apparatus shown in FIG. 1.
Figure 8B:
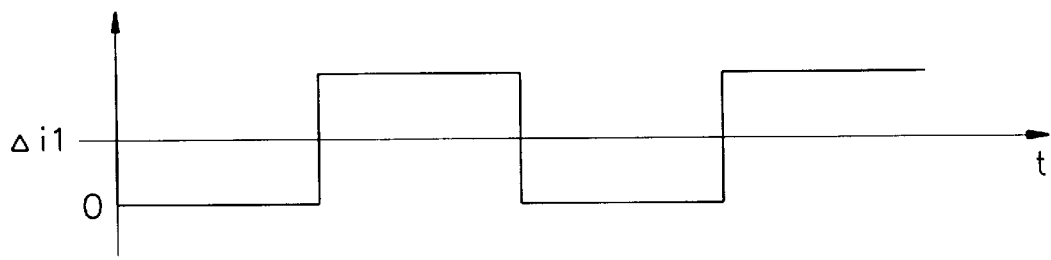
FIGS. 8B to 8D are waveform diagrams for illustrating digital signal values of current difference signals corresponding to the phase variation shown in FIG. 8A.
Figure 8C:
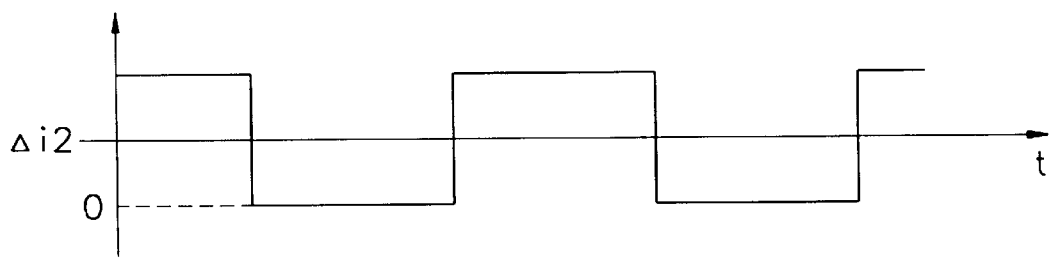
Figure 8D:
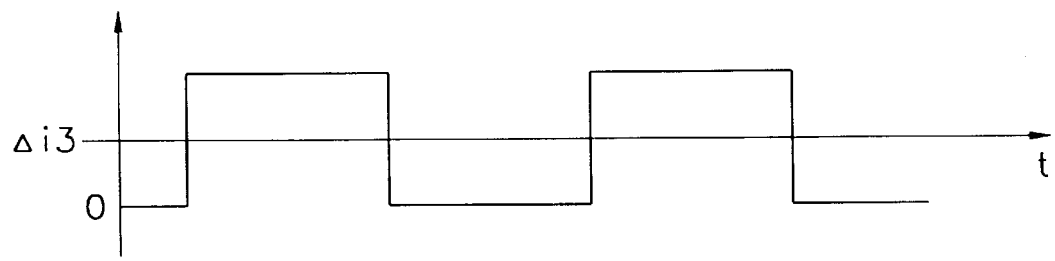
Figure 9:
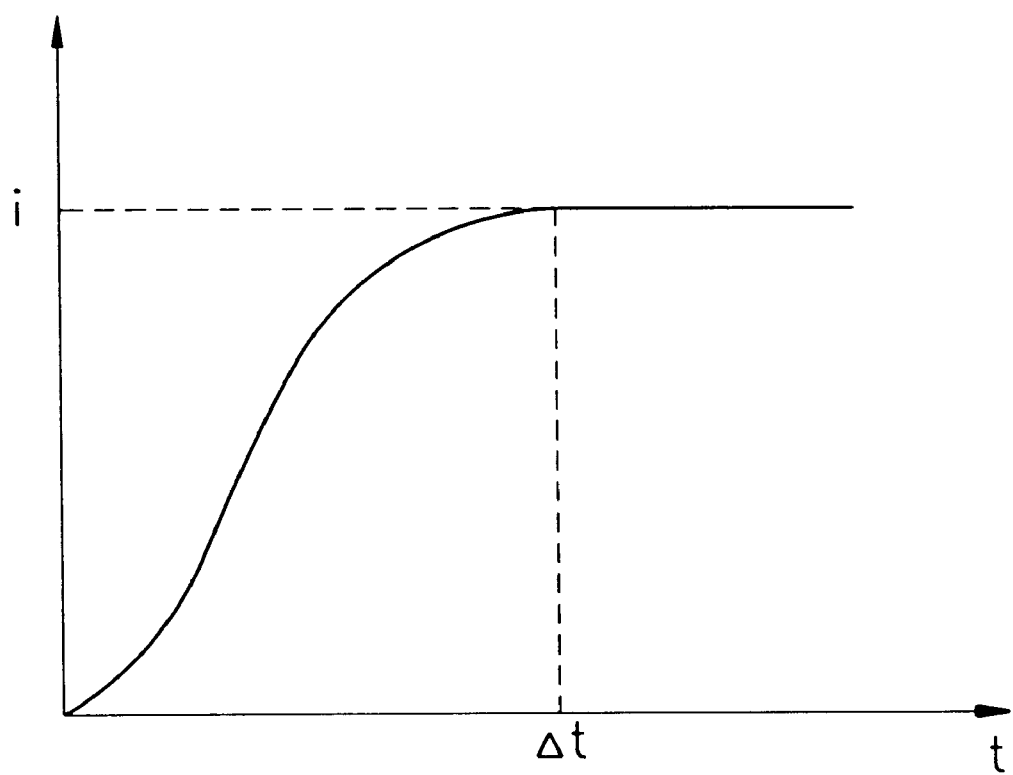
FIG. 9 is a graph for showing an optimum driving-current application period of the apparatus shown in FIG. 1.

FIGS. 2 to 4 are a flowchart for illustrating a method for driving a polyphase sensorless motor according to the present invention. FIG. 5 is a pulse waveform diagram for showing a switching control signal which is outputted from a control section of the apparatus shown in FIG. 1. FIG. 6 is a graph for showing current variation detected according to an inductance variation of the apparatus shown in FIG. 1. FIG. 7 is a graph for showing an optimum test current application period of the apparatus shown in FIG. 1. FIG. 8A is a waveform diagram for illustrating phase variation according to a magnetic flux of a head drum motor of the apparatus shown in FIG. 1. FIGS. 8B to 8D are waveform diagrams for illustrating a digital signal value of current difference signals corresponding to the phase variation shown in FIG. 8A. FIG. 9 is a graph for showing an optimum driving-current application period of the apparatus shown in FIG. 1.

As shown in FIGS. 2 to 4, control section 40 judges whether or not a recording mode or a reproducing mode of the video cassette recorder is set (step S100). When it is judged in step S100 that the mode is not set, control section 40 repeatedly executes step S100.

When it is judged in step S100 that the mode of the video cassette recorder is set, control section 40 applies first and fourth switching control signals T1 and T4 to first and fourth transistors TR1 and TR4, respectively, in order to detect a magnetic flux saturation time value of U→V phase coils 11a, 11b among the plurality of the phase coils 11a, 11b and 11c. As a result, the bias voltage Vcc which is applied to the collector terminal of first transistor TR1, namely, the first test current signal is sequentially outputted via U phase and V phase coils 11a, 11b and the emitter terminal of fourth transistor TR4 (step S110).

At this time, the current value outputted from the emitter terminal of fourth transistor TR4 is provided to control section 40 via analog-digital converting section 30, and control section 40 stores the current value according to the inductance variation of U→V phase coils 11a, 11b provided from analog-digital converting section 30 (step S120).

In step S130, control section 40 judges whether or not the magnetic flux of U→V phase coils 11a, 11b is a saturated status based on the current value provided from analog-digital converting section 30.

When it is judged in step S130 that the magnetic flux of U→V phase coils 11a, 11b is not the saturated status, control section 40 returns to step S110. When it is judged in step S130 that the magnetic flux of U→V phase coils 11a, 11b is the saturated status, control section 40 stores a time value of the saturated status as a first magnetic flux saturation time value (step S140).

As shown in FIG. 5, control section 40 applies second and third switching control signal T2 and T3 to second and third transistor TR2 and TR3, respectively, in order to detect a magnetic flux saturation time value of V→U phase coils 11b, 11a. As a result, the bias voltage Vcc which is applied to the collector terminal of third transistor TR3, namely, the second test current signal is sequentially outputted via V phase and U phase coils 11b and 11a and the emitter terminal of second transistor TR2 (step S150).

At this time, the current value outputted from the emitter terminal of second transistor TR2 is provided to control section 40 via analog-digital converting section 30, and control section 40 stores the current value according to the inductance variation of V→U phase coil 11b, 11a provided from analog-digital converting section 30 (step S160).

In step S170, control section 40 judges whether or not the magnetic flux of V→U phase coils 11b, 11a is the saturated status based on the current value provided from analog-digital converting section 30.

When it is judged in step S170 that the magnetic flux of V→U phase coils 11b, 11a is not the saturated status, control section 40 returns to step S160. When it is judged in step S170 that the magnetic flux of V→U phase coils 11b, 11a is the saturated status, control section 40 stores a time value of the saturated status as a second magnetic flux saturation time value (step S180).

Control section 40 judges whether or not V→U phase coils 11b, 11a, which the second magnetic flux saturation time value is detected, is a last pair of phase coils of sensorless motor 10 (step S190). When it is judged in step S190 that V→U phase coils 11b, 11a is not the last pair of phase coils of sensorless motor 10, control section 40 applies the first test current signal to a next pair of phase coils and returns to step S110 (step S200).

Hereat, control section 40 executes an operation which detects the magnetic flux saturation time value of V→W phase coils 11a, 11c because V→U phase coils 11b, 11a is not the last pair of phase coils.

Namely, referring to FIG. 6, control section 40 sequentially executes an operation which applies third and sixth switching control signals T3 and T6, fourth and fifth switching control signals T4 and T5, second and fifth switching control signals T2 and T5, and first and sixth switching control signals T1 and T6 in order to detect the magnetic flux saturation time value of V→W phase coils 11b, 11c, W→V phase coils 11c, 11b, W→U phase coils 11c, 11a, and U→W phase coils 11a, 11c.

At this time, the saturated status of the magnetic flux is checked by means of the current value inputted from analog-digital converting section 30. Also, the time value that the magnetic flux reaches to the saturated status, namely, the magnetic flux saturation time value is detected as shown in FIG. 6.

In step S210, control section 40 calculates a first magnetic flux saturation time difference value between the first and second magnetic flux saturation time values which is detected from U⇋V phase coils 11a, 11c, a second magnetic flux saturation time difference value between the first and second magnetic flux saturation time values which is detected from W⇋U phase coils 11c, 11a, and a third magnetic flux saturation time difference value between the first and second magnetic flux saturation time values which is detected from V⇋W phase coils 11b, 11c, respectively.

Control section 40 calculates an average value of first, second and third magnetic flux saturation time difference values (step S220) and sets the average value which is calculated in step S220 to the optimum test current application period ΔS of sensorless motor 10 (step S230).

Control section 40 determines the driving-current application initial position of sensorless motor 10 using the optimum test current application period ΔS which is set in step S230 (step S240).

Namely, referring to FIG. 7, FIGS. 8A to 8D, and a table described below, control section 40 applies either the first or the second test current signal to respective pairs of phase coils U→V, V→U, V→W, W→V, W→U and U→W during the optimum test current application period ΔS and detects maximum current values corresponding to respective pairs of phase coils U→V, V→U, V→W, W→V, W→U and U→W.

At this time, the first test current signal which is applied to U→V, V→W and W→U phase coils is applied to a first direction and the second test current signal which is applied to V→U, W→V and U→W phase coils is applied to a second direction which goes in the reverse direction of the first direction, respectively.

Control section 40 detects a current difference value Δi1 of the maximum current values between U→V phase coils 11a, 11b and V→U phase coils 11b, 11a, a current difference value Δi2 of the maximum current values between V→W phase coils 11b, 11c and W→V phase coils 11c, 11b, and a current difference value Δi3 of the maximum current values between W→U phase coils 11c, 11a and U→W phase coils 11a, 11c, respectively.

Control section 40 compares current difference values Δi1, Δi2 and Δi3 of the maximum current values which are detected from each of the pairs of phase coils and sets a position of the pair of phase coils which the current difference value is the greatest value to the driving-current application initial position.

TABLE

| Electric angle \ Motor position | Detected current differences | | |
|---|---|---|---|
| detecting signals | Δi1 | Δi2 | Δi3 |
| 0–60 | 0 | 1 | 0 |
| 60–120 | 0 | 1 | 1 |
| 120–180 | 0 | 0 | 1 |
| 180–240 | 1 | 0 | 1 |
| 240–300 | 1 | 0 | 0 |
| 300–360 | 1 | 1 | 0 |

In step S250, control section 40 selects a first maximum magnetic flux saturation time value between the first and second magnetic flux saturation time values which is detected from U⇌V phase coils 11a, 11c, a second maximum magnetic flux saturation time value between the first and second magnetic flux saturation time values which is detected from W⇌U phase coils 11c, 11a, and a third maximum magnetic flux saturation time value between the first and second magnetic flux saturation time values which is detected from V⇌W phase coils 11b, 11c, respectively.

Control section 40 detects a final maximum magnetic flux saturation time value among first, second and third maximum magnetic flux saturation time values which are selected in step S250 (step S260).

Control section 40 sets the final maximum magnetic flux saturation time value which is detected in step S260 to an optimum driving-current application period Δt of sensorless motor 10 (step S270).

At this time, optimum driving-current application period Δt is detected as shown in FIG. 6.

Control section 40 drives sensorless motor 10 based on the driving-current application initial position determined in step S240 and the optimum driving-current application period Δt set in step S270 (step S280).

Namely, control section 40 applies a driving control signal to switch driving section 30 in order to drive sensorless motor 10 during optimum driving-current application period Δt which is set in step S270. At this time, transistors TR1, TR2, TR3, TR4, TR5 and TR6 of switch driving section 30 are driven in response to the driving control signal inputted via the base terminals thereof.

Accordingly, the bias voltage which is applied to the collector terminals of transistors TR1, TR2, TR3, TR4, TR5 and TR6 is provided to the plurality of phase coils 11a, 11b and 11c, and sensorless motor 10 is driven.

In the method and apparatus for driving a polyphase sensorless motor according to the present invention, a driving-current application initial position and a driving-current application period of a head drum motor are detected based on a current value according to an inductance of the motor coil which is varied by means of a test current. As a result, a video cassette recorder can accurately determine a driving position in either a stop status or a low-speed driving status of the head drum motor and can improve a driving character thereof.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A method for driving a polyphase sensorless motor having a rotor and a plurality of pairs of phase coils, said method comprising the steps of:

(i) detecting first and second magnetic flux saturation time values which respectively correspond to first and second test current signals from each of the pairs of the phase coils by respectively and sequentially applying the first and second test current signals to the pairs of the phase coils and storing the detected first and second magnetic flux saturation time values;

(ii) setting an average value of a plurality of magnetic flux saturation time difference values calculated from the first and second magnetic flux saturation time values corresponding to each of the pairs of the phase coil to an optimum test current application period;

(iii) determining a driving-current application initial position of the polyphase sensorless motor based on the optimum test current application period which is set in step (ii);

(iv) selecting maximum magnetic flux saturation time values corresponding to each of the pairs of the phase coils from the first and second magnetic flux saturation time values detected from each of the pairs of the phase coils and setting a final maximum magnetic flux saturation time value detected from the selected plurality of maximum magnetic flux saturation time values to an optimum driving-current application period; and (v) driving the polyphase sensorless motor based on the driving-current application initial position determined in step (iii) and the optimum driving-current application period set in step (iv).

2. The method for driving a polyphase sensorless motor as claimed in claim 1, wherein said step (i) comprises the substeps of:

(i-1) detecting the first magnetic flux saturation time value corresponding to the first test current signal from a pair of phase coils among the plurality of the pairs of the phase coils by applying the first test current signal to the pair of phase coils and storing the detected first magnetic flux saturation time value;

(i-2) detecting the second magnetic flux saturation time value corresponding to the second test current signal from the pair of phase coils by applying the second test current signal to the pair of phase coils and storing the detected second magnetic flux saturation time value; and (i-3) repeating an operation which applies the first test current signal based on whether or not the pair of phase coils, which the second magnetic flux saturation time value is detected in step (i-2), is a last pair of phase coils of the plurality of the pairs of the phase coils.

3. The method for driving a polyphase sensorless motor as claimed in claim 2, wherein said step (i-1) comprises the substeps of:

(a) applying the first test current signal to the pair of phase coils;

(b) storing a current value detected from the pair of phase coils to which the first test current signal is applied;

(c) checking whether or not the magnetic flux of the pair of phase coils to which the first test current signal is applied is a saturated status;

(d) returning to step (b) when it is checked in step (c) that the magnetic flux of the pair of phase coils to which the first test current signal is applied is not the saturated status; and (e) storing a time value of the saturated status as the first magnetic flux saturation time value when it is checked in step (c) that the magnetic flux of the pair of phase coils to which the first test current signal is applied is the saturated status.

4. The method for driving a polyphase sensorless motor as claimed in claim 3, wherein said step (i-2) comprises the substeps of:

(f) applying the second test current signal to the pair of phase coils;

(g) storing a current value detected from the pair of phase coils to which the second test current signal is applied;

(h) checking whether or not the magnetic flux of the pair of phase coils to which the second test current signal is applied is the saturated status;

(i) returning to step (g) when it is checked in step (h) that the magnetic flux of the pair of phase coils to which the second test current signal is applied is not the saturated status; and (j) storing the time value of the saturated status as the second magnetic flux saturation time value when it is checked in step (h) that the magnetic flux of the pair of phase coils to which the second test current signal is applied is the saturated status.

5. The method for driving a polyphase sensorless motor as claimed in claim 4, wherein said step (i-3) comprises the substeps of:

(k) checking whether or not the pair of phase coils, which the second magnetic flux saturation time value is detected in step (j), is the last pair of phase coils of the plurality of the pairs of phase coils;

(l) applying the first test current signal to a next pair of phase coils and returning to step (b) when it is checked in step (k) that the pair of phase coils, which the second magnetic flux saturation time value is detected, is not the last pair of phase coils; and (m) proceeding to step (ii) when it is checked in step (k) that the pair of phase coils, which the second magnetic flux saturation time value is detected, is the last pair of phase coils.

6. The method for driving a polyphase sensorless motor as claimed in claim 1, wherein said step (ii) comprises the substeps of:

(ii-1) detecting the magnetic flux saturation time difference values between the first magnetic flux saturation time value and second magnetic flux saturation time value from the respective pairs of phase coils;

(ii-2) calculating the average value of magnetic flux saturation time difference values which is detected in step (ii-1);

(ii-3) setting the average value calculated in step (ii-2) to the optimum test current application period of the polyphase sensorless motor.

7. The method for driving a polyphase sensorless motor as claimed in claim 1, wherein said step (iv) comprises the substeps of:

(iv-1) selecting the maximum magnetic flux saturation time values corresponding to the respective pairs of phase coils from the first and second magnetic flux saturation time values stored in step (i), respectively;

(iv-2) detecting the final maximum magnetic flux saturation time value among the maximum magnetic flux saturation time values selected in step (iv-1); and (iv-3) setting the final maximum magnetic flux saturation time value detected in step (iv-2) to the optimum driving-current application period of the polyphase sensorless motor.

8. The method for driving a polyphase sensorless motor as claimed in claim 1, wherein the first test current signal is applied to a first direction and the second test current signal is applied to a second direction which goes in the reverse direction of the first direction, respectively.

9. An apparatus for driving a polyphase motor having a rotor and a plurality of pairs of phase coils, said apparatus comprising:

switch driving means, responsive to switching control signals inputted from outside, for supplying first and second test current signals to the plurality of the pairs of the phase coils, respectively, for detecting a current value from the plurality of the pairs of the phase coils, and for outputting the detected current value;

analog-digital converting means for converting the current value inputted from said switch driving means into a digital signal; and control means for providing the switching control signals to said switch driving means in order to supply the first and second test current signals to the plurality of the pairs of the phase coils, for detecting first and second magnetic flux saturation time values of each of the plurality of the pairs of the phase coils which respectively correspond to the first and second test current signals based on the current value inputted from said analog-digital converting means, for setting an average value of a plurality of magnetic flux saturation time difference values calculated from the first and second magnetic flux saturation time values to an optimum test current application period, for determining a driving-current application initial position of the polyphase sensorless motor based on the set optimum test current application period, for selecting maximum magnetic flux saturation time values corresponding to each of the plurality of the pairs of the phase coils from the detected first and second magnetic flux saturation time values, respectively, and for setting a final maximum magnetic flux saturation time value which is detected from the selected plurality of the maximum magnetic flux saturation time values to an optimum driving-current application period of the polyphase sensorless motor.

* * * * *